United States Patent
Abe et al.

(10) Patent No.: US 9,855,847 B2
(45) Date of Patent: Jan. 2, 2018

(54) TROUGH, PAVED STRUCTURE, AND CONSTRUCTION METHOD FOR PAVED STRUCTURE

(71) Applicant: TOA ROAD CORPORATION, Tokyo (JP)

(72) Inventors: Nagato Abe, Yokohama (JP); Kazunori Manabe, Tsukuba (JP); Michio Yoshitake, Tsukuba (JP)

(73) Assignee: TOA ROAD CORPORATION, Tokyo (JP)

( * ) Notice: Subject to any disclaimer, the term of this patent is extended or adjusted under 35 U.S.C. 154(b) by 230 days.

(21) Appl. No.: 14/778,179

(22) PCT Filed: Aug. 12, 2013

(86) PCT No.: PCT/JP2013/071764
§ 371 (c)(1),
(2) Date: Sep. 18, 2015

(87) PCT Pub. No.: WO2014/147857
PCT Pub. Date: Sep. 25, 2014

(65) Prior Publication Data
US 2016/0236572 A1    Aug. 18, 2016

(30) Foreign Application Priority Data

Mar. 21, 2013   (JP) .................. 2013-058503

(51) Int. Cl.
*B60L 5/00* (2006.01)
*E01C 9/00* (2006.01)
(Continued)

(52) U.S. Cl.
CPC ............. *B60L 5/005* (2013.01); *B60L 11/182* (2013.01); *B60L 11/1831* (2013.01); *E01C 1/00* (2013.01);
(Continued)

(58) Field of Classification Search
CPC .... B60L 5/005; B60L 11/182; B60L 11/1833; B60L 9/00; B60L 11/1829;
(Continued)

(56) References Cited

U.S. PATENT DOCUMENTS 4,361,202 A * 11/1982 Minovitch ......... B60K 31/0008
                                                        104/88.02
5,390,118 A *  2/1995 Margolis .................. B62D 1/28
                                                           180/168
(Continued)

FOREIGN PATENT DOCUMENTS

CN        1463868 A    12/2003
CN      201915316 U     8/2011
(Continued)

OTHER PUBLICATIONS

Chinese Office Action and Search Report for Chinese Application No. 201380074841.0, dated Jun. 6, 2016.
(Continued)

*Primary Examiner* — Mark T Le
(74) *Attorney, Agent, or Firm* — Birch, Stewart, Kolasch & Birch, LLP (57) ABSTRACT

A trough used for feeding power to a traveling body in a noncontact manner, a paved structure, and a method of constructing the paved structure. The trough used for a paved structure feeding power to a power receiver provided in a traveling body through an electromagnetic wave, includes: a trough body having a trough depression extending in the direction in which the traveling body runs; a magnetic member laid in the trough depression; a power feeding body laid on the magnetic member to feed power to the power receiver through an electromagnetic wave; and a power feeding body protector laid in the trough depression to cover the power feeding body.

8 Claims, 10 Drawing Sheets

(51) Int. Cl.

| | |
|---|---|
| *E01C 1/00* | (2006.01) |
| *B60L 11/18* | (2006.01) |
| *H02J 50/10* | (2016.01) |
| *B60M 7/00* | (2006.01) |

(52) U.S. Cl.
CPC .............. *E01C 9/00* (2013.01); *H02J 50/10* (2016.02); *B60L 2230/16* (2013.01); *B60M 7/003* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC ...... B60L 11/1809; B60M 7/003; B60M 7/00; H02J 5/005; H02J 7/025; H02J 17/00; H01F 38/14; G05D 1/0265
USPC .......................................................... 191/10
See application file for complete search history.

(56) References Cited

U.S. PATENT DOCUMENTS

| | | | |
|---|---|---|---|
| 5,573,090 | A | 11/1996 | Ross |
| 5,595,271 | A | 1/1997 | Tseng |
| 6,049,191 | A | 4/2000 | Terazoe et al. |
| 2008/0129246 | A1 | 6/2008 | Morita et al. |
| 2011/0052317 | A1 | 3/2011 | Jeter et al. |
| 2011/0094840 | A1 | 4/2011 | Sakita |
| 2011/0186368 | A1 | 8/2011 | Ueno et al. |
| 2012/0186927 | A1 | 7/2012 | Suh et al. |
| 2012/0306262 | A1 | 12/2012 | Taguchi |
| 2012/0318625 | A1 | 12/2012 | Woronowicz et al. |
| 2013/0092491 | A1 | 4/2013 | Suh et al. |
| 2014/0145518 | A1 | 5/2014 | An |
| 2015/0035481 | A1 | 2/2015 | Cho et al. |

FOREIGN PATENT DOCUMENTS

| | | | |
|---|---|---|---|
| CN | 201966647 | U | 9/2011 |
| CN | 102465482 | A | 5/2012 |
| DE | 102008013649 | A1 | 10/2009 |
| EP | 0488305 | A1 | 6/1992 |
| EP | 2515314 | A1 | 10/2012 |
| GB | 2485616 | A | 5/2012 |
| JP | 6-78406 | A | 3/1994 |
| JP | 11-238638 | A | 8/1999 |
| JP | 2000-116036 | A | 4/2000 |
| JP | 2005-224045 | A | 8/2005 |
| JP | 2007-12775 | A | 1/2007 |
| JP | 2010-22183 | A | 1/2010 |
| JP | 2010-172084 | A | 8/2010 |
| JP | 2011-49230 | A | 3/2011 |
| JP | 2011-135772 | A | 7/2011 |
| KR | 10-2005-0080017 | A | 8/2005 |
| KR | 10-2011-0041937 | A | 4/2011 |
| WO | WO 2011/076437 | A2 | 6/2011 |
| WO | WO 2011/078616 | A2 | 6/2011 |
| WO | WO 2012/050345 | A2 | 4/2012 |
| WO | WO 2012/069495 | A2 | 5/2012 |
| WO | WO 2012/141357 | * | 10/2012 |
| WO | WO 2012/141357 | A1 | 10/2012 |

OTHER PUBLICATIONS

Extended European Search Report for European Application No. 13878844.3, dated Oct. 6, 2016.
Extended European Search Report for European Application No. 13879131.4, dated Oct. 6, 2016.
Office Action issued in the corresponding Korean Patent Application No. 10-2015-7025755 dated Jan. 3, 2017.
Office Action issued in the corresponding Korean Patent Application No. 10-2015-7025756 dated Jan. 3, 2017.
International Search Report, issued in PCT/JP2013/073062, dated Oct. 8, 2013.
Choudhury et al., "Inductive Power Transfer to Highway Vehicles", The Engineering Society for Advancing Mobility Land Sea Air and Space, 1989, 891706, pp. 51-60.
International Search Report, issued in PCT/JP2013/071764, dated Oct. 8, 2013.
Chinese Office Action and Chinese Search Report, dated Jun. 2, 2016, for Chinese Application No. 201380074839.3.
U.S. Office Action, dated Jul. 6, 2017, for U.S. Appl. No. 14/776,285.

\* cited by examiner

TROUGH, PAVED STRUCTURE, AND CONSTRUCTION METHOD FOR PAVED STRUCTURE

TECHNICAL FIELD

The present invention relates to a paved structure on which a traveling body such as an automobile runs and a method of constructing the paved structure. Particularly, the present invention relates to a trough used for feeding power to a traveling body in a noncontact manner, a paved structure, and a method of constructing the paved structure.

BACKGROUND ART

Traveling bodies such as electric vehicles (EV) and hybrid electric vehicles (HEV) that are loaded with a secondary cell rotate the motor by using power stored in the secondary cell to drive the wheels. From the viewpoint of environmental safeguard, the traveling bodies running by power stored in the secondary cell are desired to become widely used, since they hardly exhaust environmentally infective material as nitrogen oxide and carbon dioxide.

The electric vehicles traveling by power of the secondary cell have to be charged when the charged capacity of the secondary cell decreases. Generally, to charge such electric automobiles, the electric vehicles are connected with a power feeder at charging stations or at home. This charging method damages the connection due to wear-out, etc., not to obtain enough contact force and therefore requires maintenance to obtain enough contact force. Furthermore, this charging method may cause sparks in the connection and cannot therefore be used in an explosion-proof area. To solve these problems, a method of charging an electric vehicle in a noncontact manner has been proposed, in which the coil provided in the electric vehicle is aligned with that in a certain place at a charging station, etc. to generate power by electromagnetic induction (for example, see Patent Documents 1 to 3).

CITATION LIST

Patent Literature

Patent Document 1: JP 2010-172084 A
Patent Document 2: JP 2011-49230 A
Patent Document 3: JP H11-238638 A

SUMMARY OF INVENTION

Technical Problem

These proposals enable the electric vehicle to be charged in a noncontact manner with a power feeder. However, the electric vehicle has to stay in place until the secondary cell is completely charged. Therefore, these proposals have problems because the electric vehicle has to stop at considerably many charging stations, etc. and spend considerable time to charge the secondary cell when the electric vehicle travels long distance.

In consideration of the above-mentioned circumstances, the present invention has been achieved. Therefore, an objective of the present invention is to provide a trough used for feeding power to a traveling body in a noncontact manner, a paved structure, and a method of constructing the paved structure.

Solution to Problem

The present invention provides [1] to [10] described below.

[1] A trough used for a paved structure feeding power to a power receiver provided in a traveling body through an electromagnetic wave, including:
a trough body having a trough depression extending in the direction in which the traveling body runs;
a magnetic member laid in the trough depression so that a flat upper surface is formed;
a power feeding body laid on the upper surface of the magnetic member to feed power to the power receiver through an electromagnetic wave; and
a power feeding body protector laid in the trough depression to cover the power feeding body.

[2] The trough according to [1], in which
the trough body has a partition in the center of the trough depression to form two grooves in the trough depression, and
the power feeding body has two conductors laid in the respective two grooves.

[3] The trough according to [1], in which
the trough body has a partition formed in the center of the trough depression to form two grooves in the trough depression,
the partition is formed from a plurality of protrusions aligned to form a plurality of spaces connecting the two grooves with each other, and
the power feeding body has a coiled conductor laid in any two of the plurality of spaces and in the two grooves.

[4] The trough according to any one of [1] to [3], in which the trough body contains aggregate formed of stainless, aluminum, or combination thereof and a concrete covering the aggregate.

[5] The trough according to any one of [1] to [4], in which the magnetic member contains slag.

[6] The trough according to any one of [1] to [4], further including;
a visible part visible from the traveling body, in which
the visible part is provided on the upper surface of the power feeding body protector over the power feeding body.

[7] The trough according to [6], in which the visible part is colored in a color different from that of the power feeding body protector.

[8] The trough according to [6] or [7], in which the visible part is formed of a retro reflective material.

[9] A paved structure feeding power to a power receiver provided in a traveling body through an electromagnetic wave, including;
a cutting part extending in the direction in which the traveling body runs; and
a plurality of troughs according to any one of [1] to [8] laid in the cutting part.

[10] A method of constructing the paved structure according to [9], including the steps of:
forming a depression in the paved structure;
laying a plurality of troughs in the cutting part; and
electrically connecting the plurality of troughs with each other.

Advantageous Effects of Invention

The present invention provides a trough used for feeding power to a traveling body in a noncontact manner, a paved structure, and a method of constructing the paved structure.

FIRST EMBODIMENT

Figure 1A:
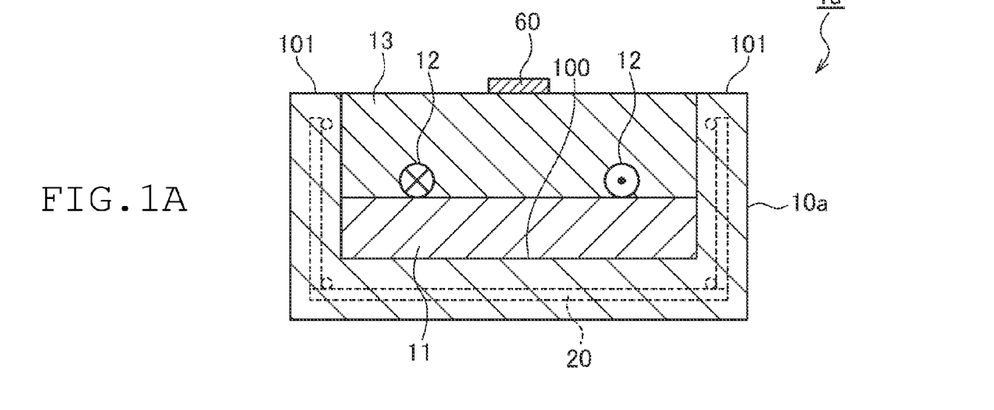
FIG. 1A shows a schematic cross-sectional view of the trough according to the first embodiment of the present invention.
Figure 1B:
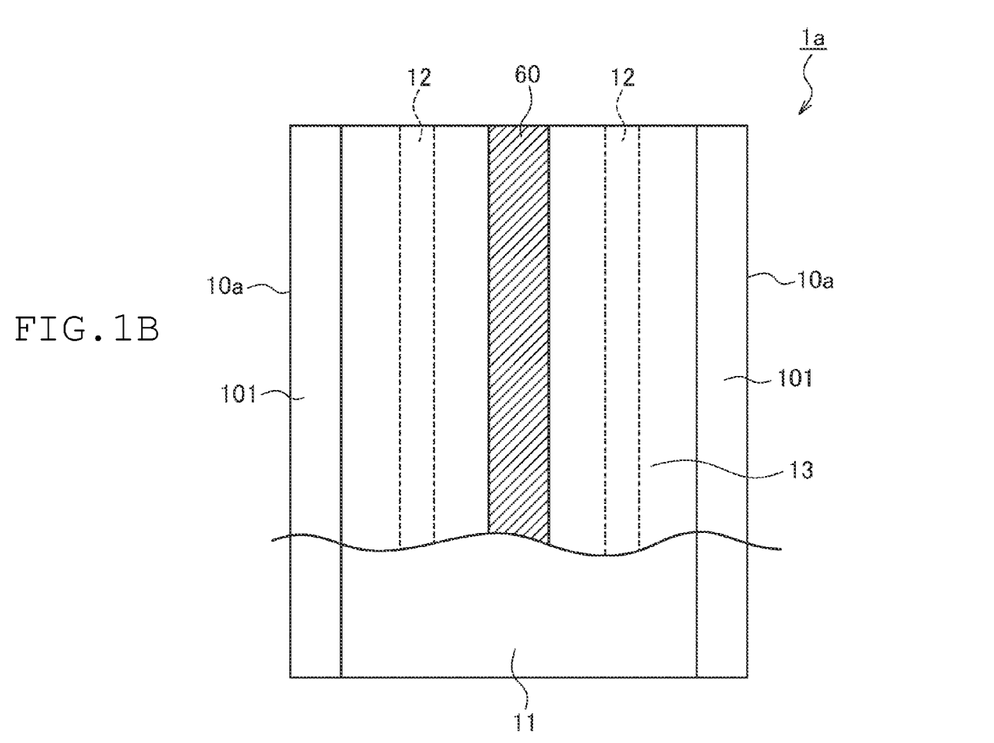
FIG. 1B shows a schematic plan view of the trough according to the first embodiment of the present invention.

As shown in FIGS. 1A and 1B, the trough 1a according to the first embodiment of the present invention, which is used for a paved structure 5 feeding power to a power receiver 3 provided in a traveling body 2 through an electromagnetic wave, includes: a trough body 10a having a trough depression 100 extending in the direction in which the traveling body 2 runs; a magnetic member 11 laid in the trough depression 100 so that a flat upper surface is formed; a power feeding body 12 laid on the upper surface of the magnetic member 11 to feed power to the power receiver 3 through an electromagnetic wave; a power feeding body protector 13 laid in the trough depression 100 to cover the power feeding body 12; and a visible part 60.

As shown in FIG. 1A, the trough body 10a contains aggregate 20 formed of stainless, aluminum, or combination thereof and a concrete covering the aggregate 20. The trough surface 101 of the trough body 10a is preferably roughened to have an antiskid function.

The trough body 10a has a trough depression 100 extending in the direction in which the traveling body 2 runs, which has a U-shaped cross-section. From the viewpoint of having the power feeding body 12 inside, the trough depression 100 has a depth of preferably from 50 to 150 mm, more preferably from 80 to 120 mm. From the viewpoint of facilitating the production and the transportation, the length of the trough body 10a in the direction in which the trough depression 100 extends is preferably from 1.0 to 4.0 m, more preferably from 2.0 to 3.0 m. From the viewpoint of facilitating the production and the transportation and laying the trough 1a in the cutting part 14 of the paved structure 5, the trough body 10a has a width of preferably from 1.0 to 4.0 m, more preferably from 2.0 to 3.0 m in a direction perpendicular to the direction in which the trough depression 100 extends. From the viewpoint of embedding the trough 1a in the cutting part 14, the trough depression 100 has a depth of preferably from 80 to 200 mm, more preferably from 100 to 150 mm.

Figure 2:
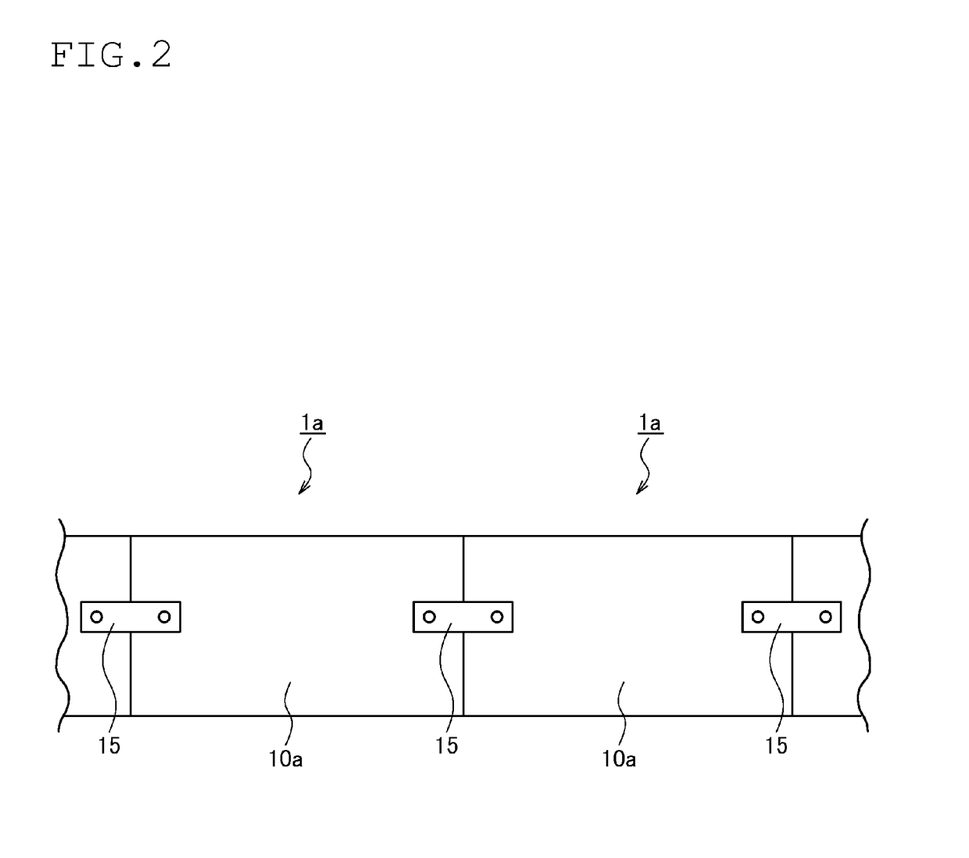
FIG. 2 shows a schematic view illustrating the troughs according to the first embodiment of the present invention that are connected by connecting members.

As shown in FIG. 2, the trough bodies 10a can be connected with each other by using a connecting member 15 capable of connecting the trough bodies 10a with each other. The troughs 1a are connected with each other to continuously lay a plurality of troughs 1a on the paved structure 5.

Figure 3A:
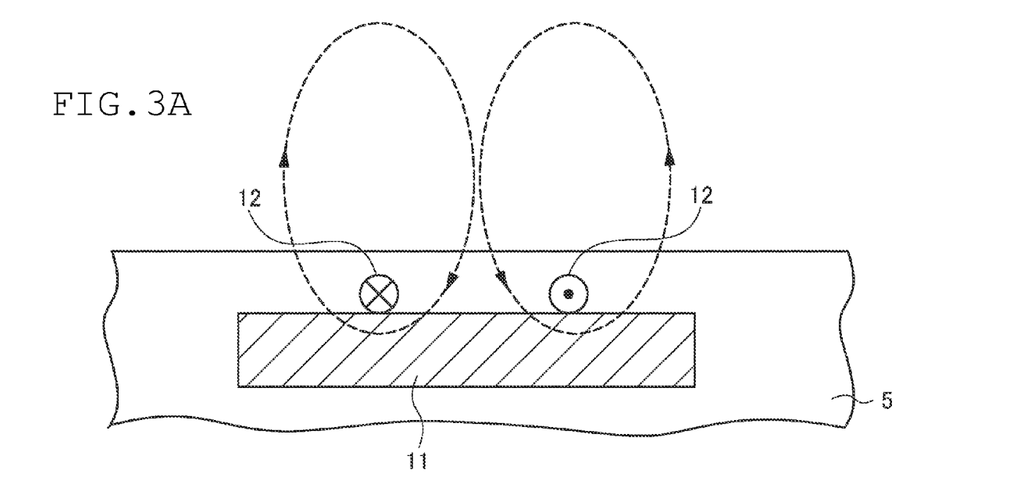
FIGS. 3A and 3B show a schematic view illustrating an effect of the magnetic member in the paved structure according to the first embodiment of the present invention.
Figure 3B:
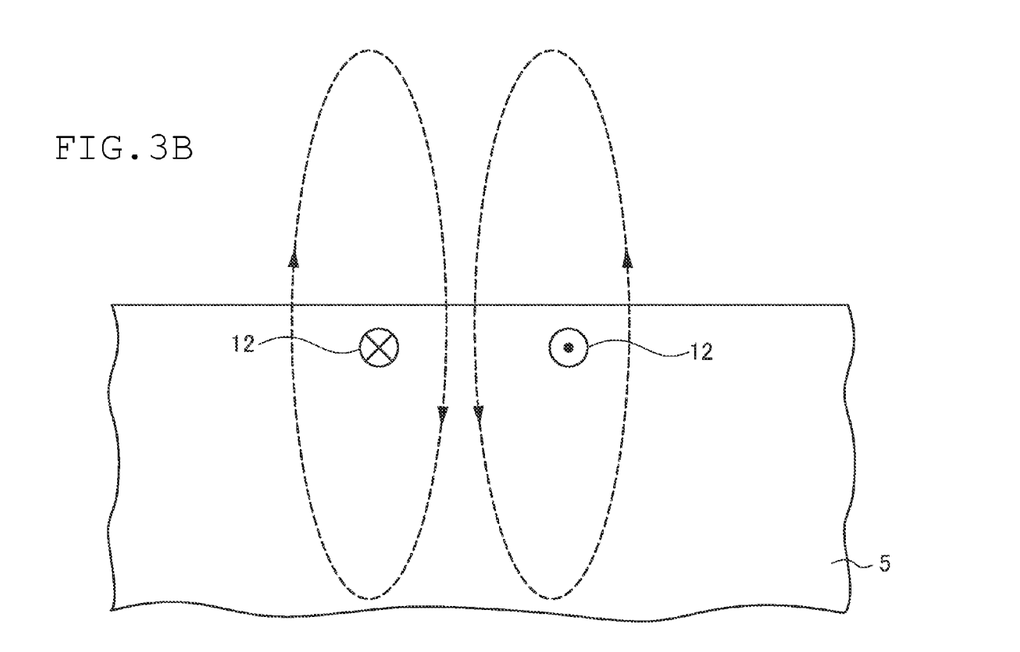

As shown in FIG. 3A, the magnetic member 11 is laid in the ground deeper than the power feeding body 12 so that a flat upper surface is formed to control the range in the magnetic field generated by the power feeding body 12. The dotted lines in FIG. 3A show magnetic flux. If no magnetic members 11 are not laid, magnetic flux generated by the power feeding body 12 penetrates deeper in the paved structure 5 as shown in FIG. 3B. The dotted lines in FIG. 3B also show magnetic flux. If a magnetic member 11 with a flat upper surface is laid, the magnetic flux can be converged in the surface side of the paved structure 5 without penetrating deeper in the paved structure 5. In other words, the magnetic member 11 converges magnetic flux to form a strong magnetic field, so that the electromagnetic wave caused by a changing magnetic field can be strengthened.

In addition, since the upper surface of the magnetic member 11 is flat, the magnetic flux converged in the surface side has a width approximately equal to that of the magnetic member 11. This hardly irregularly converges magnetic flux in the width direction of the magnetic member 11. Therefore, feeding power to the power receiver 3 in a traveling body 2 does not influenced too much even if the traveling body 2 runs a little off from the depression 10.

The magnetic member 11 is formed of a magnetic body such as magnetic slag. Magnetic slag is slag aggregate that contains from 50 to 80% of a magnetic body such as iron. The magnetic member 11 contains preferably from 10 to 40%, more preferably from 15 to 35% of magnetic slag from the viewpoint of increasing the conductivity. Since magnetic slag is hard, preferably 10% or more, more preferably 15% or more of magnetic slag is mixed in the magnetic member 11 from the viewpoint of maintaining the durability of the magnetic member 11 over which a heavy traveling body 2 such as a truck also passes.

The magnetic member 11 has a thickness of preferably 15 mm or more, more preferably 30 mm or more, from the viewpoint of fulfilling the function of converging the magnetic flux in the surface side of the paved structure 5.

The power feeding body 12 is composed of conductors (electric wires) placed in parallel to apply electric current in the direction opposite to each other to receive high-frequency electric current from a power feeding facility 6. When receiving the current, the power feeding body 12 generates a magnetic field. The power feeding body 12 then receives alternating current to change the magnetic field and the electric field according to the frequency of the alternating current, so as to generate electromagnetic waves.

The power feeding body protector 13 is provided to cover and protect the power feeding body 12 from impact, etc., from a traveling body 2 running on the paved structure 5. The power feeding body protector 13 protects the power feeding body 12 from external force to prevent the power feeding body 12 from physical damage such as cutoff and bending. The power feeding body protector 13 has an elastic modulus of preferably 1000 MPa or more, more preferably 3000 MPa or more, from the viewpoint of protecting the power feeding body 12. Furthermore, the power feeding body protector 13 has a uniaxial compressive strength of preferably 1 MPa or more, more preferably 3 MPa or more, from the viewpoint of protecting the power feeding body 12. Yet furthermore, the power feeding body protector 13 has a thickness of preferably 30 mm or more, more preferably 50 mm or more to cover the power feeding body 12, from the viewpoint of protecting the power feeding body 12.

The power feeding body protector 13 is preferably the same magnetic body as or a different magnetic body from the magnetic member 11 from the viewpoint of not disturbing the magnetic field generated from the power feeding body 12. More preferably, the power feeding body protector 13 has a higher conductivity than the magnetic member 11.

The visible part 60 is formed on the surface layer of the power feeding body protector 13 to make the position in which the power feeding body 12 is buried visible from a traveling body 2. Specifically, the visible part 60 is, for example, specially paved and extends in the direction in which the trough 1a extends, to inform a driver who drives a traveling body 2 about the position in which the power feeding body 12 is buried.

The trough 1a is provided with a visible part 60 in this way, so that the driver can easily identify the position in which the power feeding body 12 is buried when needing charge the traveling body 2.

This enables a person getting on a traveling body 2 or a car-mounted camera in a traveling body 2 to recognize the visible part 60 paved in a color, so as to control the direction in which the traveling body 2 runs. As a result, the traveling body 2 can run to accurately position the power receiver 3 over the power feeding body 12 without going off the power feeding body 12 to increase the power receiving efficiency of the power receiver 3.

Figure 4:
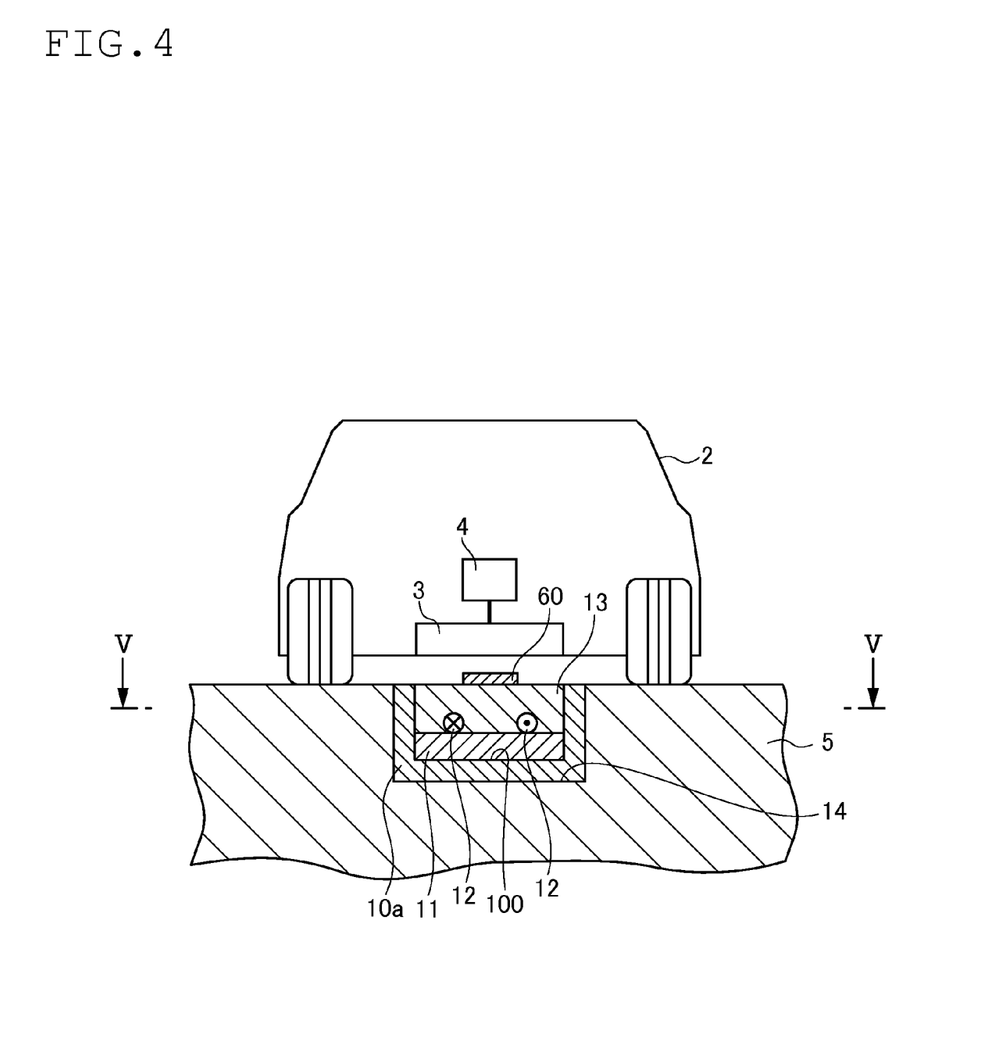
FIG. 4 shows a schematic cross-sectional view of the paved structure according to the first embodiment of the present invention.

The traveling body 2 is an electric vehicle (EV), an hybrid vehicle (HEV), etc., which has a power receiver 3 near the floor chassis to receive electromagnetic waves emitted from the power feeding body 12 and also has a secondary cell 4, for example, under the floor of the vehicle interior, as shown in FIG. 4. The traveling body 2 rotates the motor (not shown) by using power stored in the secondary cell 4 to drive the wheels.

The power receiver 3 is a coil, etc. that can obtain power by the electromagnetic induction phenomenon caused by electromagnetic waves. The power receiver 3 is connected with the secondary cell 4 to deliver the obtained power to the secondary cell 4. The power receiver 3 preferably has an amplifier, etc. to amplify the power.

The power receiver 3 receives electromagnetic waves emitted from the power feeding body 12 and obtains the power generated by the electromagnetic induction phenomenon caused by magnetic flux flow. The power obtained by the power receiver 3 is stored in the secondary cell 4 through a control circuit (not shown) controlling charge, discharge, etc.

The secondary cell 4 is provided with a control circuit controlling charge, discharge, etc., a cooling device, etc. As the secondary cell 4, cells capable of charge and discharge, such as lithium-ion cells can be used.

The paved structure 5 is a paved road, etc. on which a traveling body 2 can run. When paved with cement concrete, asphalt concrete, etc., the paved structure 5 is composed of a subgrade, a base layer, and a surface layer in descending order of depth. The paved structure 5 paved with cement concrete, asphalt concrete, etc. is provided with a trough 1a in the base layer and the surface layer.

Figure 5:
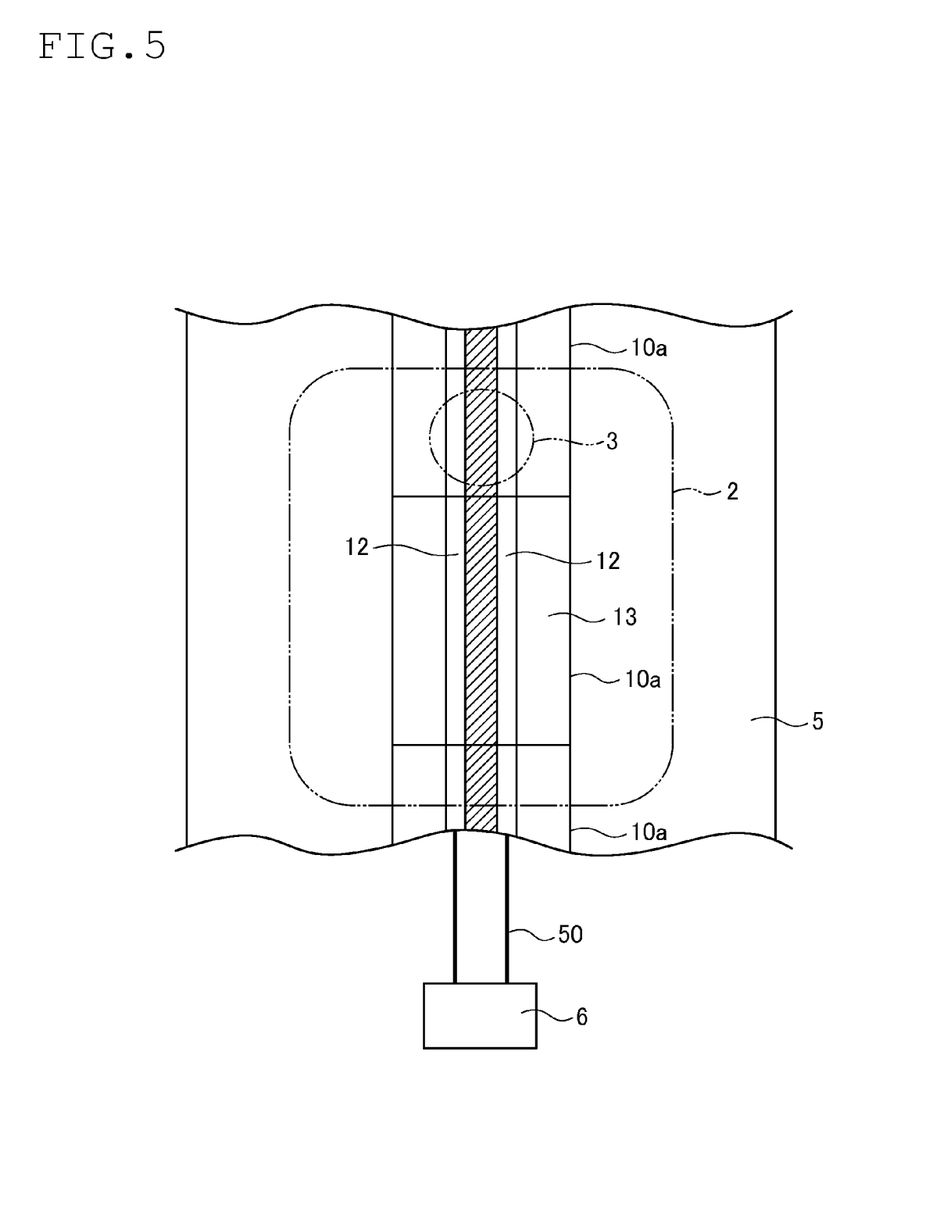
FIG. 5 shows a schematic cross-sectional view along the direction V-V shown in FIG. 4.

As shown in FIGS. 4 and 5, the cutting part 14 extends in the direction in which the traveling body 2 runs. The cutting part 14 is cut by a cutter, etc., in which a trough 1a is laid. From the viewpoint of having the elements inside, the cutting part 14 has a width of preferably from 0.5 to 2.0 m, more preferably from 0.5 to 1.0 m, and a depth of preferably from 100 to 250 mm, more preferably from 100 to 150 mm.

The power feeding facility 6 is electrically connected with the power feeding body 12 through a power feeding line 50 embedded in the ground as shown in FIG. 5. The power feeding facility 6 is an alternator, which supplies high-frequency electric current. The power feeding facility 6 is preferably located outside running lanes.

The method of constructing the paved structure 5 according to the first embodiment is described below in reference to FIGS. 6A to 6C.

Step of Forming Cutting Part

Figure 6A:
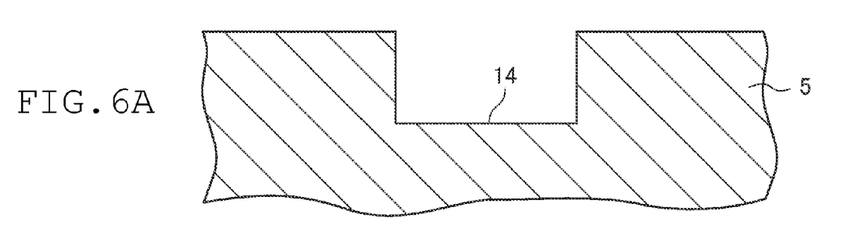
FIGS. 6A to 6C show a process schematic diagram illustrating the method of constructing the paved structure according to the first embodiment of the present invention.
Figure 6B:
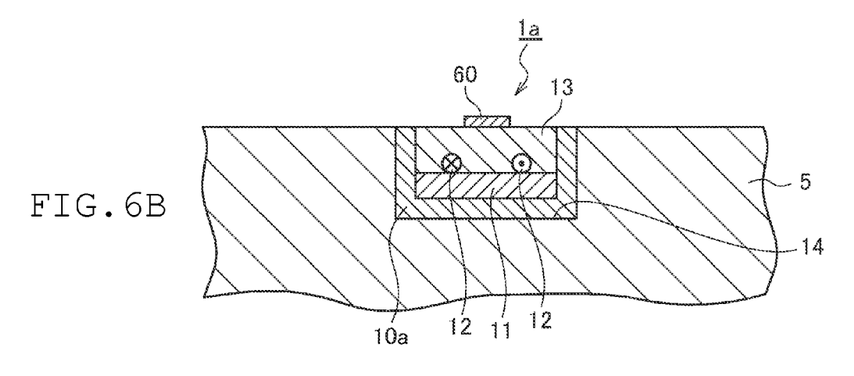
Figure 6C:
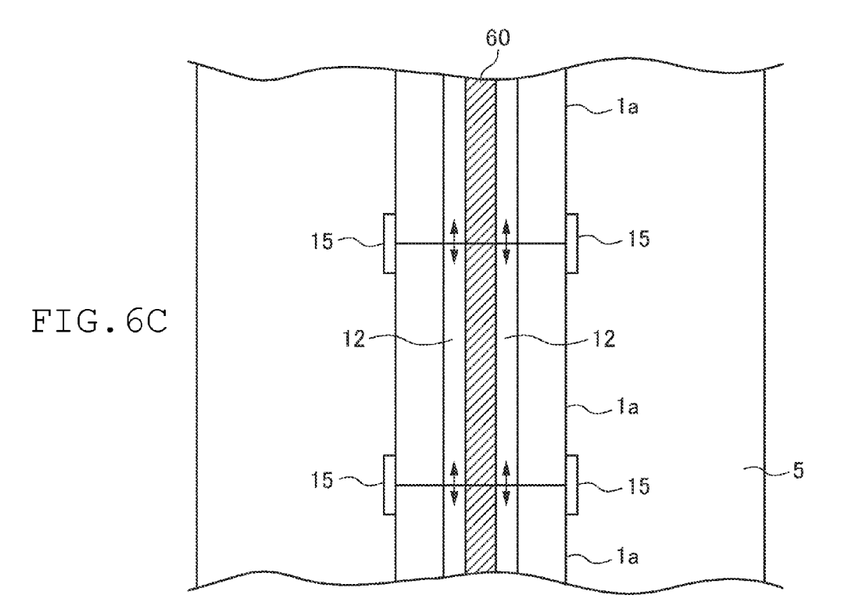

First, in the step shown in FIG. 6A, a cutting part 14 with a desired width and a desired depth is formed in the paved structure 5 with a cutter, etc. to extend in the direction in which the traveling body 2 runs.

Step of Laying Trough

Subsequently, in the step shown in FIG. 6B, a trough 1a is laid in the cutting part 14. A plurality of troughs 1a are preferably all aligned in the direction in which the traveling body 2 runs.

Step of Connecting Troughs with Each Other

Subsequently, in the step shown in FIG. 6C, adjacent troughs 1a are connected with each other. In the connection of troughs 1a, the respective power feeding bodies 12 are electrically connected with each other. The troughs 1a are physically connected with each other by using connecting members 15 as shown in FIG. 2.

The paved structure 5 constructed by the above-mentioned construction method, which feeds power to a power receiver 3 provided in a traveling body 2 through an electromagnetic wave, includes a cutting part 14 extending in the direction in which the traveling body 2 runs; and a plurality of troughs 1a laid in the cutting part 14.

How the paved structure 5 feeds power is explained below.

While running by using the power saved in the secondary cell 4, the traveling body 2 consumes power from the secondary cell 4 and requires to be charged. The traveling body 2 required to be charged then runs on the paved structure 5 in which the power feeding body 12 is embedded.

While the traveling body 2 runs on the paved structure 5 in which the power feeding body 12 is embedded, the power feeding body 12 receives high-frequency electric current from a power feeding facility 6 and generates and emits electromagnetic waves to the traveling body 2. The power receiver 3 of the traveling body 2 running over the power feeding body 12 receives the emitted electromagnetic waves. The power receiver 3 obtains power from the voltage generated by an electromagnetic wave change by using the electromagnetic induction phenomenon caused by the received electromagnetic waves. The power receiver 3 delivers the obtained power and charges the secondary cell 4.

The trough 1a and the paved structure 5 according to the first embodiment can feed power to a running traveling body 2 through an electromagnetic wave. Therefore, the secondary cell 4 can be charged while a traveling body 2 is running. As a result, the traveling body 2 keeps running without stopping by a charging station, etc., even when running long distance as an electric vehicle.

SECOND EMBODIMENT

Figure 7A:
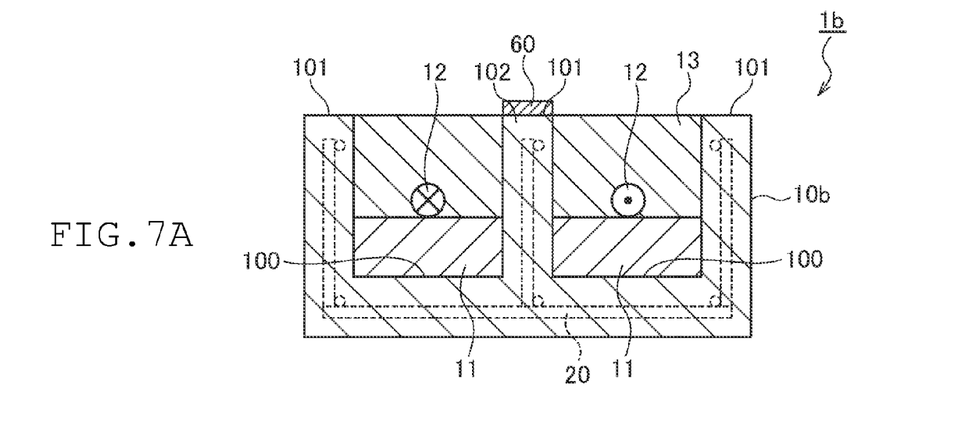
FIG. 7A shows a schematic cross-sectional view of the trough according to the second embodiment of the present invention.
Figure 7B:
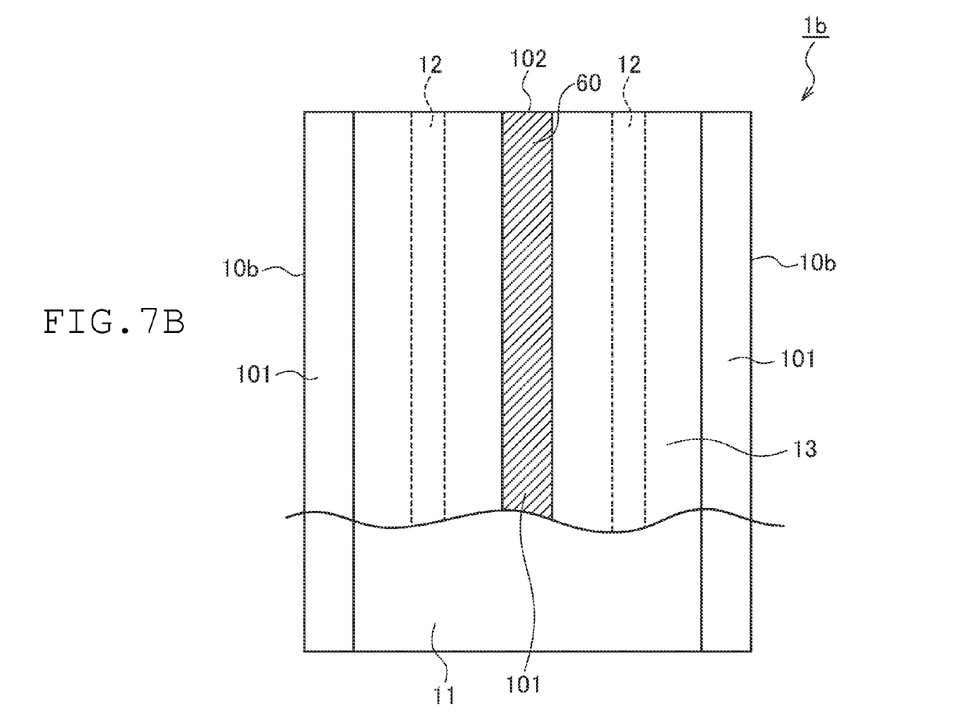
FIG. 7B shows a schematic plan view of the trough according to the second embodiment of the present invention.
Figure 8:
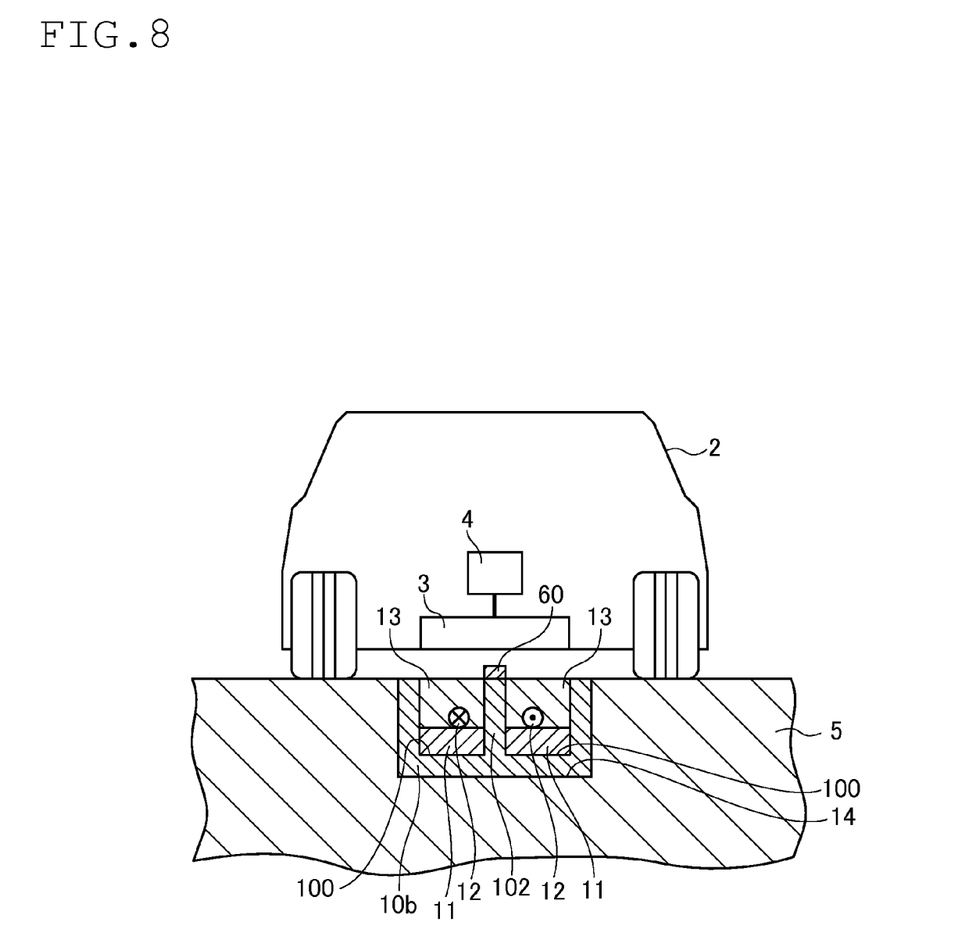
FIG. 8 shows a schematic cross-sectional view of the paved structure according to the second embodiment of the present invention.

The trough 1b and the paved structure 5 according to the second embodiment of the present invention are the same as the trough 1a and the paved structure 5 according to the first embodiment except that the trough body 10b has a partition 102 in the center of the trough depression 100 to form two grooves in the trough depression 100 and except that the power feeding body 12 is composed of two conductors as shown in FIGS. 7 and 8. The explanation of the same part is left out.

The trough body 10b has two grooves each having a conductor forming the power feeding body 12, which has an E-shaped cross-section.

The partition 102 of the trough body 10b separates the two conductors of the power feeding body 12 laid in the respective grooves from each other so as to prevent electromagnetic waves emitted from the respective power feeding bodies 12 from canceling each other out.

In addition, a visible part 60 may be formed on the surface of the partition 102. Specifically, the visible part 60 that is, for example, particularly paved and extends in the direction in which the partition 102 extends is provided on the surface of the partition 102 to inform a driver who drives a traveling body 2 about the position in which the power feeding body 12 is buried.

The method of constructing the paved structure 5 according to the second embodiment is described below in reference to FIGS. 9A to 9C.

Step of Forming Cutting Part

Figure 9A:
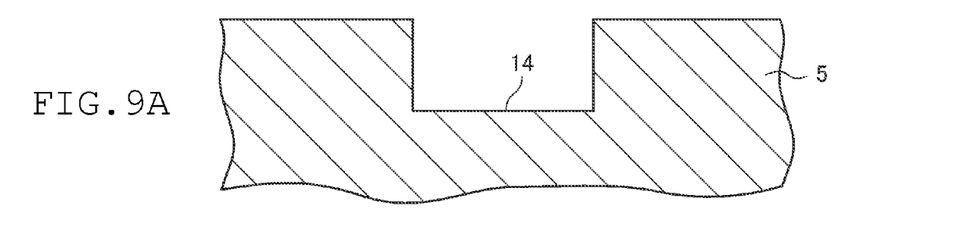
FIGS. 9A to 9C show a process schematic diagram illustrating the method of constructing the paved structure according to the second embodiment of the present invention.
Figure 9B:
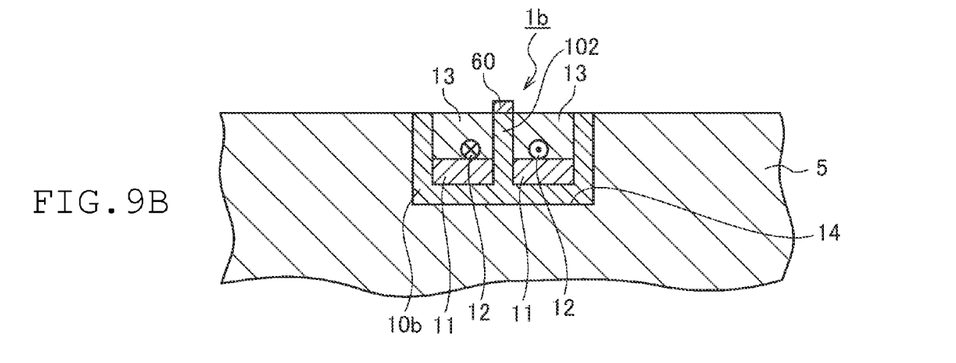
Figure 9C:
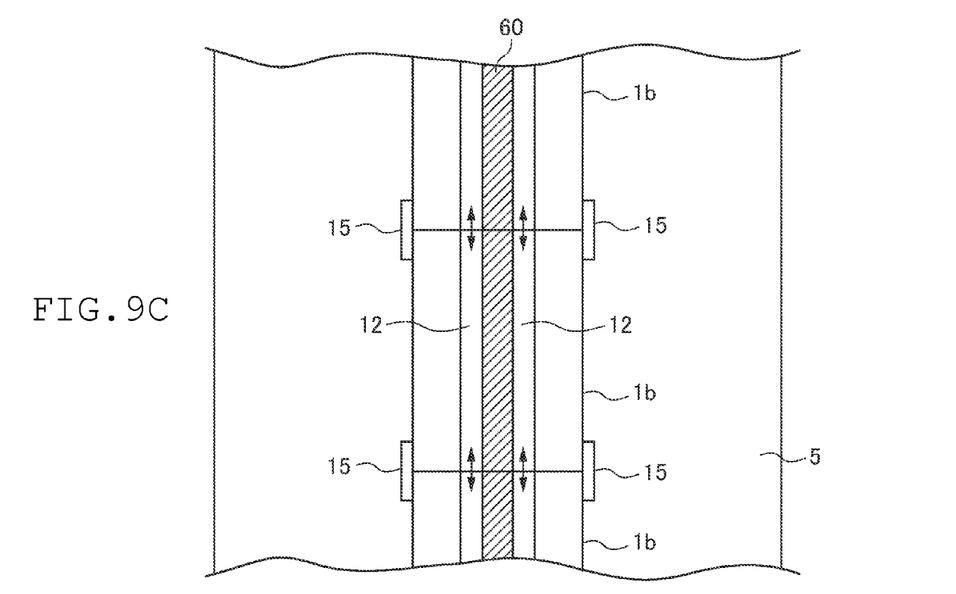

First, in the step shown in FIG. 9A, a cutting part 14 with a desired width and a desired depth is formed in the paved structure 5 with a cutter, etc. to extend in the direction in which the traveling body 2 runs.

Step of Laying Trough

Subsequently, in the step shown in FIG. 9B, a trough 1b is laid in the cutting part 14. A plurality of troughs 1b are preferably all aligned in the direction in which the traveling body 2 runs.

Step of Connecting Troughs with Each Other

Subsequently, in the step shown in FIG. 9C, adjacent troughs 1b are connected with each other. In the connection of troughs 1b, the respective power feeding bodies 12 are electrically connected with each other. The troughs 1b are physically connected with each other by using connecting members 15 as shown in FIG. 2.

The troughs 1b and the paved structure 5 that are thus formed in accordance with the second embodiment of the present invention can obtain a similar effect to that of the troughs 1a and the paved structure 5 that are thus formed in accordance with the first embodiment.

Furthermore, the troughs 1b and the paved structure 5 according to the second embodiment has a partition 102 of the trough body 10b so as to prevent electromagnetic waves emitted from the respective power feeding bodies 12 from canceling each other out. As a result, the paved structure 1c can emit strong electromagnetic waves to a traveling body 2.

OTHER EMBODIMENTS

The present invention is described above in reference to the embodiments. However, it should not be understood that the description and the drawings incorporated in this disclosure limit the present invention. Various alternative embodiments, examples, and operation technologies of this disclosure will be apparent to those skilled in the art.

For example, in the troughs 1a and 1b according to the first and the second embodiments, respectively, an electromagnetic wave shield which cuts off the electromagnetic waves emitted from the power feeding body 12 so as not to propagate electromagnetic waves in the ground is preferably laid on the inner wall of the trough depression 100. The electromagnetic wave shield is preferably formed from a stainless panel or net, an aluminum panel or net, or combination thereof.

The troughs 1a and 1b have an electromagnetic wave shield so as to cut off electromagnetic waves other than those emitted to a traveling body 2. As a result, the paved structure 1b can reduce electromagnetic waves propagating from the power feeding body 12 to the ground.

In addition, a visible part 60 may be provided on the surface layer of the paved structure 5 according to the first and the second embodiments to make the position of the power feeding body 12 from a traveling body 2. The visible part 60 that is, for example, specially paved is provided on the paved structure 5 (road) in which the power feeding body 12 is embedded to allow a driver who drives a traveling body 2 to recognize the position in which the power feeding body 12 is buried. For example, the visible part 60 is paved with a red color mixture by mixing iron oxide (red oxide, $Fe_2O_3$) in the dense-graded asphalt mixture for surface layer of the paved structure 5 and the cutting part 102. Therefore, the visible part 60 has a different color from those of other pavements to inform the driver about the position of the power feeding body 12. The visible part 60 may be paved with a retro reflective material to inform the driver by its reflection about the position of the power feeding body 12.

The paved structure 5 is provided with a visible part 60 in this way, so that the driver can easily identify the position of the power feeding body 12 when needing charge the traveling body 2.

Figure 10:
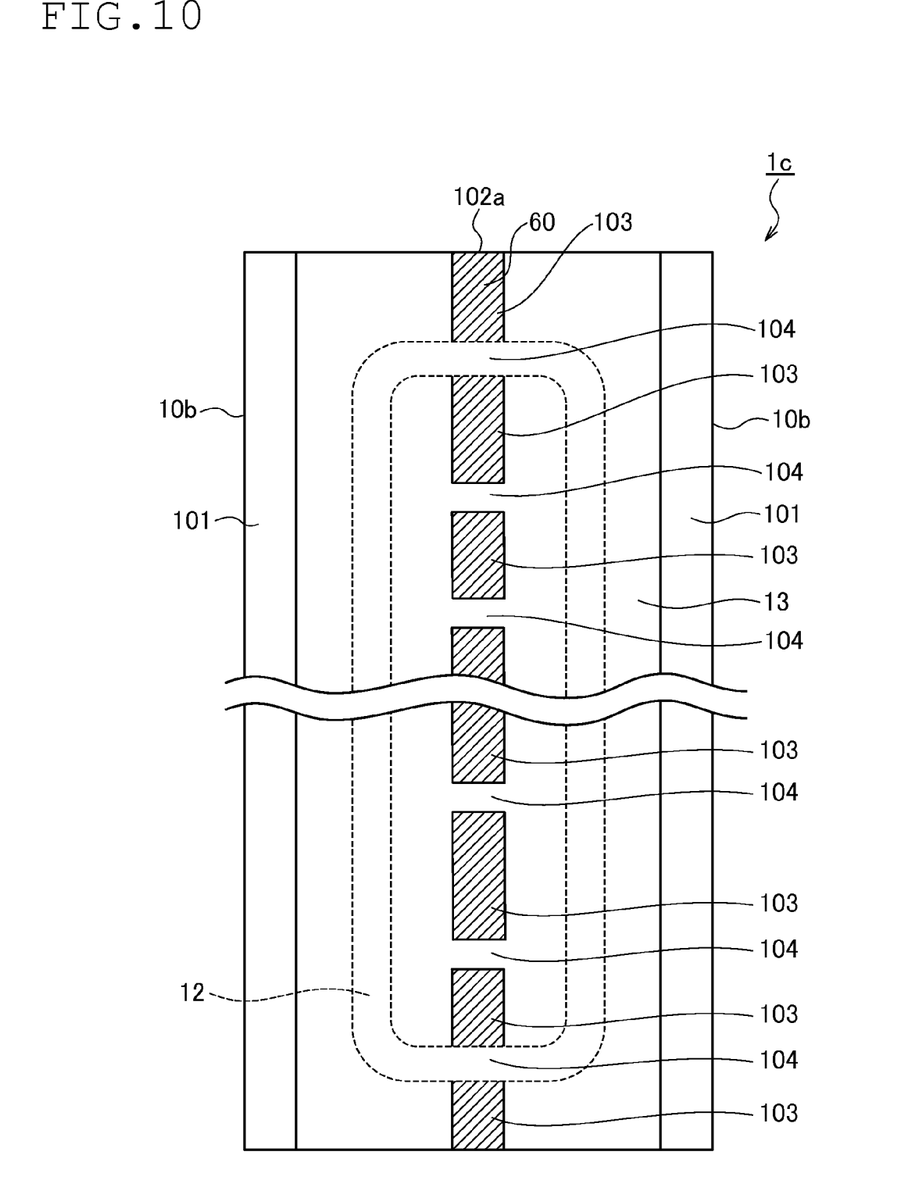
FIG. 10 shows a schematic plan view of a variation of the trough shown in FIG. 7.

The trough 1b of the second embodiment has a partition 102 formed in a plate shape, but the trough is not limited thereto and may be a trough 1c that has a partition 102a formed from a plurality of protrusions 103 aligned to form a plurality of spaces 104 connecting the two grooves with each other. In this case, the power feeding body 12 has one or more coiled conductors laid in any two of the plurality of spaces 104 and in the two grooves.

It thus should be understood that the present invention encompasses various embodiments, etc. not described herein. Therefore, the present invention is limited only to matters to define an invention which are stated in claims appropriate from this disclosure.

REFERENCE SIGNS LIST 1a, 1b Trough
2 Traveling body
3 Power receiver
4 Secondary cell
5 Paved structure
6 Power feeding facility
10a, 10b, 10c Trough body
11 Magnetic member
12 Power feeding body
13 Power feeding body protector
50 Power feeding line
60 Visible part
100 Trough depression
101 Trough surface 102, 102a Partition
103 Protrusion
104 Space

The invention claimed is:

1. A trough used for a paved structure feeding power to a power receiver provided in a traveling body through an electromagnetic wave, comprising:
   a trough body having a trough depression extending in the direction in which the traveling body runs;
   a magnetic member laid in the trough depression so that a flat upper surface is formed;
   a power feeding body laid on the upper surface of the magnetic member to feed power to the power receiver through an electromagnetic wave; and
   a power feeding body protector laid in the trough depression to cover the power feeding body, wherein
   the trough body has a partition formed in the center of the trough depression to form two grooves in the trough depression,
   the partition is formed from a plurality of protrusions aligned to form a plurality of spaces connecting the two grooves with each other, and
   the power feeding body has a coiled conductor laid in any two of the plurality of spaces and in the two grooves.

2. The trough according to claim 1, wherein the trough body contains aggregate formed of stainless, aluminum, or combination thereof and a concrete covering the aggregate.

3. The trough according to claim 1, wherein the magnetic member contains slag.

4. The trough according to claim 1, further comprising:
   a visible part visible from the traveling body, wherein
   the visible part is provided on the upper surface of the power feeding body protector over the power feeding body.

5. The trough according to claim 4, wherein the visible part is colored in a color different from that of the power feeding body protector.

6. The trough according to claim 4, wherein the visible part is formed of a retro reflective material.

7. A paved structure feeding power to a power receiver provided in a traveling body through an electromagnetic wave, comprising:
   a cutting part extending in the direction in which the traveling body runs; and
   a plurality of troughs according to claim 1 laid in the cutting part.

8. A method of constructing the paved structure according to claim 7, comprising the steps of:
   forming a depression in the paved structure;
   laying a plurality of troughs in the cutting part; and
   electrically connecting the plurality of troughs with each other.

* * * * *